United States Patent
Suzuki et al.

(10) Patent No.: US 8,766,577 B2
(45) Date of Patent: Jul. 1, 2014

(54) THREE-PHASE ROTARY MACHINE CONTROL APPARATUS

(75) Inventors: Takashi Suzuki, Obu (JP); Jirou Hayashi, Ama-gun (JP)

(73) Assignee: Denso Corporation, Kariya (JP)

( * ) Notice: Subject to any disclaimer, the term of this patent is extended or adjusted under 35 U.S.C. 154(b) by 94 days.

(21) Appl. No.: 13/563,938

(22) Filed: Aug. 1, 2012

(65) Prior Publication Data
US 2013/0033210 A1 Feb. 7, 2013

(30) Foreign Application Priority Data
Aug. 1, 2011 (JP) .................................. 2011-168213

(51) Int. Cl.
*H02P 6/08* (2006.01)
*H02P 29/00* (2006.01)

(52) U.S. Cl.
CPC .................................. *H02P 29/0055* (2013.01)
USPC ............ 318/400.22; 318/400.21; 318/400.01; 318/700

(58) Field of Classification Search
CPC .......................... H02P 29/0055; H02P 21/0089
USPC ..................... 318/400.22, 400.21, 400.01, 700
See application file for complete search history.

(56) References Cited

U.S. PATENT DOCUMENTS

| 4,814,964 | A | 3/1989 | Schauder et al. |
| 7,141,948 | B2 * | 11/2006 | Kifuku et al. ................. 318/432 |
| 7,176,644 | B2 * | 2/2007 | Ueda et al. ............... 318/400.14 |
| 7,180,263 | B2 * | 2/2007 | Maeda et al. ................. 318/719 |
| 8,040,093 | B2 * | 10/2011 | Atarashi ................. 318/400.27 |

FOREIGN PATENT DOCUMENTS

| JP | 5-260792 | 10/1993 |
| JP | 2005-102394 | 4/2005 |
| JP | 4356295 | 8/2009 |

OTHER PUBLICATIONS

Office Action (2 pages) dated Jun. 11, 2013, issued in corresponding Japanese Application No. 2011-168213 and English translation (3 pages).

* cited by examiner

*Primary Examiner* — David Luo
(74) *Attorney, Agent, or Firm* — Nixon & Vanderhye PC

(57) ABSTRACT

A first inverter and a second inverter supply two coil sets forming a three-phase motor with AC voltages, which are the same in amplitude but shifted by 30° in phase. Current detectors detect phase currents supplied from the inverters to the coil sets. Temperature estimation sections estimate temperatures of the inverters or the coil sets based on an integration value of the phase current detection values. A current command value limitation section limits upper limits of current command values of both coil sets based on the estimated temperatures Tm1 and Tm2. Thus, the inverters and the coils sets are protected from overheating without increasing torque ripple.

2 Claims, 5 Drawing Sheets

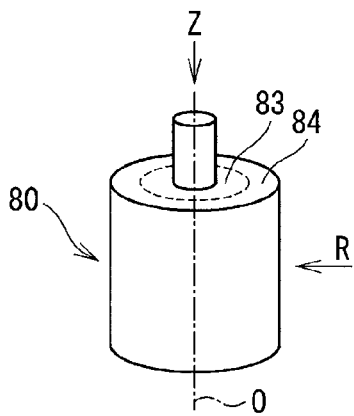
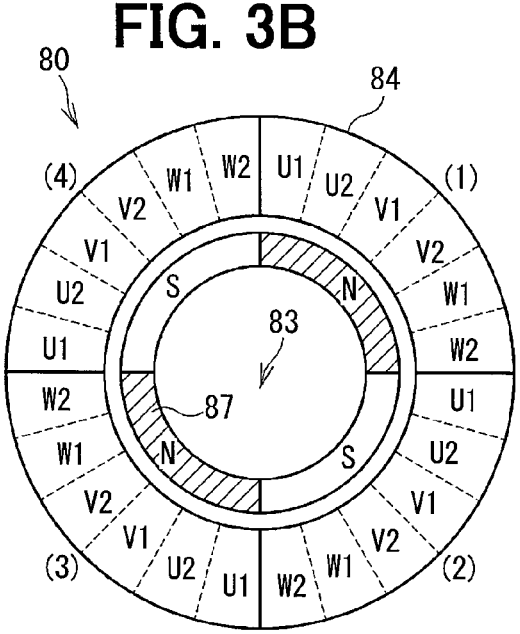
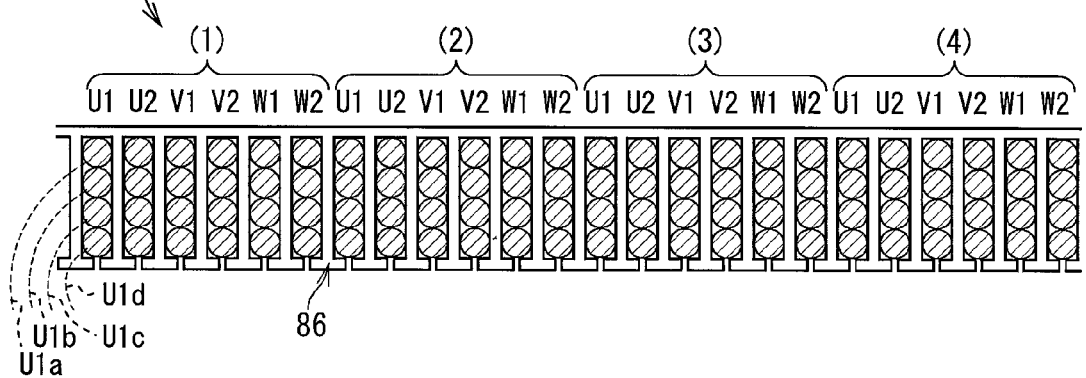
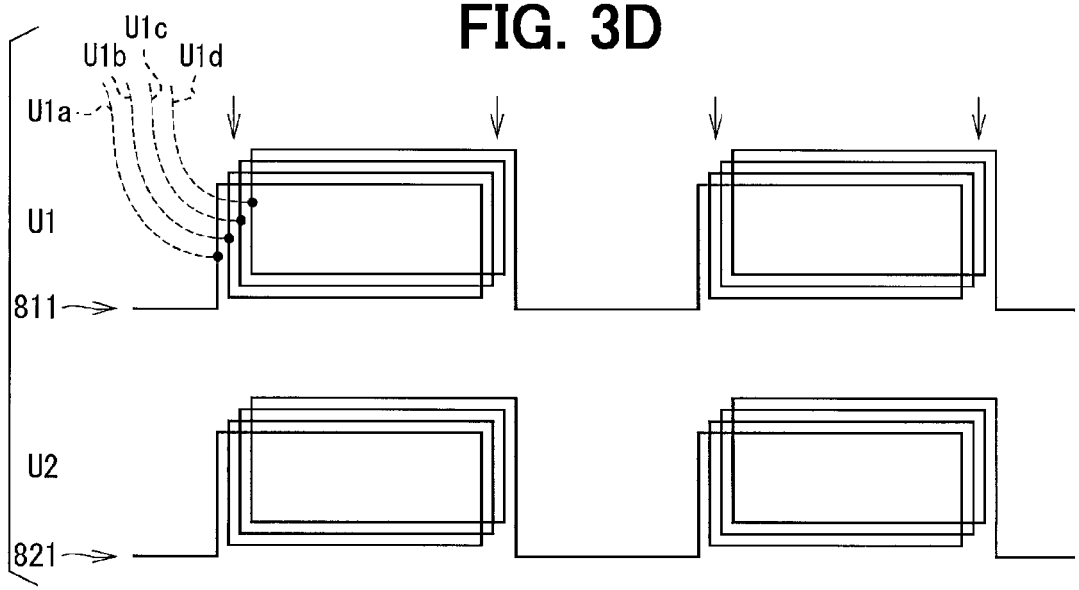

THREE-PHASE ROTARY MACHINE CONTROL APPARATUS

CROSS REFERENCE TO RELATED APPLICATION

This application is based on and incorporates herein by reference Japanese patent application No. 2011-168213 filed on Aug. 1, 2011.

TECHNICAL FIELD

The present invention relates to a three-phase rotary machine control apparatus.

BACKGROUND ART

Some conventional control apparatuses for controlling driving of a three-phase rotary machine include two power supply systems of power converters in correspondence to two three-phase coil sets, each of which includes three phase coils of a three-phase rotary machine.

According to JP 02-70286A (patent document 1) corresponding to U.S. Pat. No. 4,814,964, for example, an AC motor drive apparatus is provided with two three-phase inverters for a motor, which has two coil sets angularly spaced apart by an angle of 30° from each other. Each coil set includes three phase coils. The two three-phase inverters are connected to the two coil sets of an AC motor, respectively. The two three-phase inverters generate three-phase AC currents, which are phase-shifted, from a DC pulse current. The inverters supply the AC currents to the two three-phase coil sets. Thus torque ripple (fluctuation of torque) of the motor is reduced.

It is necessary to prevent a rotary machine such as a motor from damages caused by heat. JP 4356295 (patent document 2) proposes to protect an electric power steering system, which assists steering of a vehicle, from overheating of a motor by estimating a motor temperature based on an integrated value of a motor current and limiting the motor current so that the estimated motor current does not exceed a predetermined temperature.

The overheat prevention according to the patent document 2 is provided for a system, which has one coil set and one power converter. If this overheat prevention is applied to a motor of two power supply systems, which includes two coil sets and two power converters for a motor as exemplified in patent document 1, it is likely that the overheat protection is applied to each of two power supply systems. In this case, when the estimated temperature rises in one of the two power supply systems, the current will be limited only in one power supply system actually suffering from overheat. As a result, the currents supplied in the two power supply systems differ and increase torque ripples. Although shifting of phase of currents supplied by the two power supply systems is effective to suppress torque ripple, such shifting does not contribute to suppression of torque ripple. In case that the motor and the control apparatus are applied to an electric power steering system, the increased torque ripple will adversely influence on a driver's steering operation.

SUMMARY

It is therefore an object to suppress torque ripple and overheat of power converters and coil sets in a control apparatus for a three-phase rotary machine having two coil sets.

According to one aspect, a control apparatus is provided for a three-phase rotary machine having two coil sets, each of which is formed of three phase coils. The control apparatus comprises two power converters, tow current detectors and a control circuit. The power converters are provided for the two coil sets, to supply AC power voltages to the two coils sets, respectively. The AC power voltages have same amplitudes and different phases of $(30\pm60\times n)°$ phase difference from each other with "n" being an integer. The current detectors detect phase currents supplied from the two power converters to the two coils sets, respectively. The control circuit includes a current command value calculation section for outputting a current command value to both of the two power converters and a current command value limitation section for setting an upper limitation value of the current command value. The control circuit controls the two power converters by feeding back the phase current detection values of the two current detectors to the current command value, respectively. The current command value limitation section sets the current limitation value based on a predetermined physical amount calculated as a function of the phase current detection values detected by the current detectors.

BRIEF DESCRIPTION OF DRAWINGS

The above and other objects, features and advantages of the present invention will become more apparent from the following detailed description made with reference to the accompanying drawings. In the drawings:

FIGS. 3A, 3B, 3C and 3D are schematic views of component parts of a three-phase rotary machine, which is controlled by the control apparatus shown in FIG. 1;

DETAILED DESCRIPTION OF EMBODIMENT

A control apparatus for controlling a three-phase rotary machine (three-phase rotary machine control apparatus) will be described with reference to one embodiment, in which the three-phase rotary machine control apparatus is implemented in an electric power steering system shown in FIGS. 1 and 2.

Figure 2:
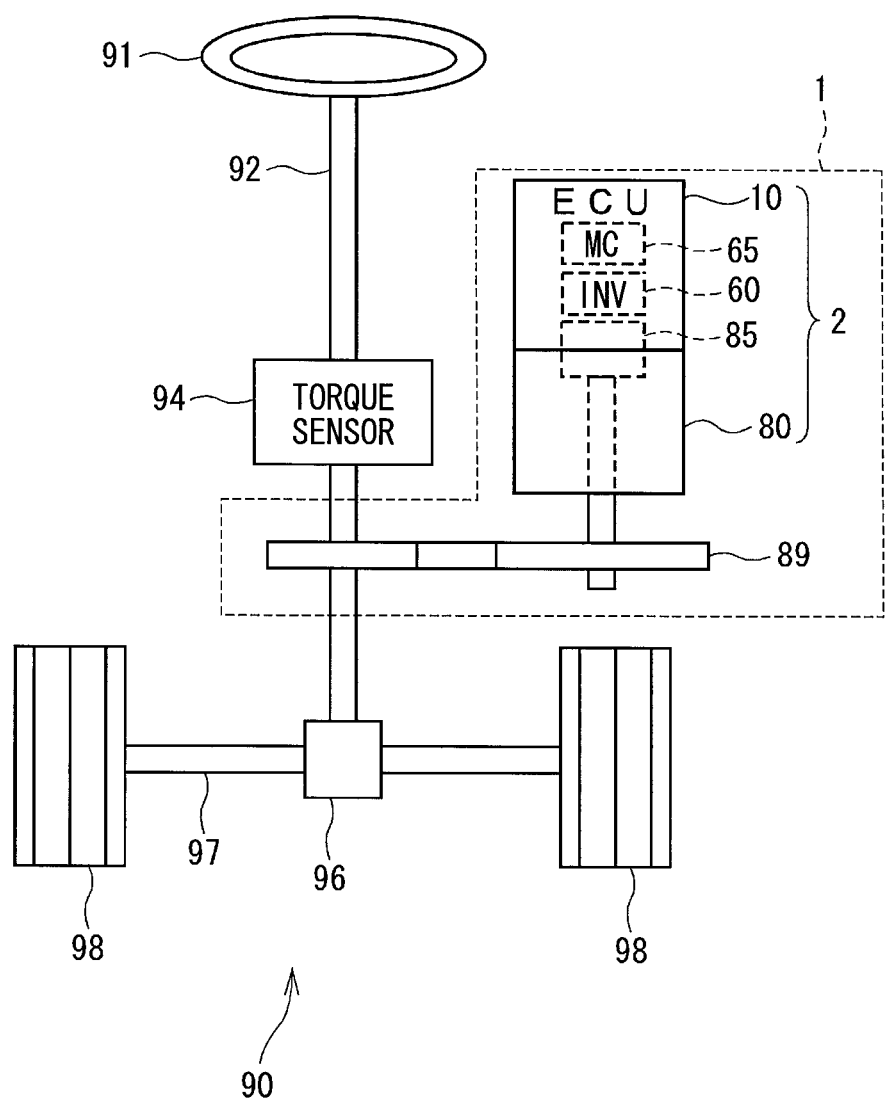
FIG. 2 is a schematic diagram of an electric power steering system, to which the control apparatus shown in FIG. 1 is applied.

An electric power steering system 1 is provided in a steering system 90 of a vehicle as shown in FIG. 2. In this steering system 90, a torque sensor 94 is attached to a steering shaft 92 of a steering wheel 91 for detecting a steering torque. A pinion gear 96 is provided at a top end of the steering shaft 92 and engaged with a rack shaft 97. A pair of tire wheels 98 is coupled rotatably to both ends of the rack shaft 97 through tie rods and the like (not shown). The rotary motion of the steering shaft 92 is changed to the linear motion of the rack shaft 97 by the pinion gear 96 so that the pair of tire wheels 98 is steered by an angle corresponding to the linear motion of the rack shaft 97.

The electric power steering system 1 includes an actuator 2 and a reduction gear 89. The actuator 2 rotates a rotary shaft 81. The reduction gear 89 transfers rotation of the rotary shaft 81 to the steering shaft 92 after speed reduction. The actuator 2 is formed of a motor 80 and an ECU (electronic control unit) 10. The motor 80 is a three-phase brushless motor which generates steering assist torque.

The ECU 10 includes a control circuit such as a microcomputer 65, an inverter 60 for controlling power supply to the motor 80 in response to commands from the control circuit 65. A rotation angle sensor 85 is provided to detect rotation angle of the motor 80. The rotation angle sensor 85 may be formed of, for example, a magnet provide at the motor 80 side as a magnetism generator and a magneto-resistive device provided at the ECU 10 side.

The control circuit 65 is configured to control outputs to the inverter 60 based on the steering torque signal of the torque sensor 94, a rotation angle signal of the rotation angle sensor 85 and the like. Thus the actuator 2 of the electric power steering system 1 generates steering assist torque for assisting a steering operation of the steering wheel 91 and transfers the same to the steering shaft 92.

Figure 1:
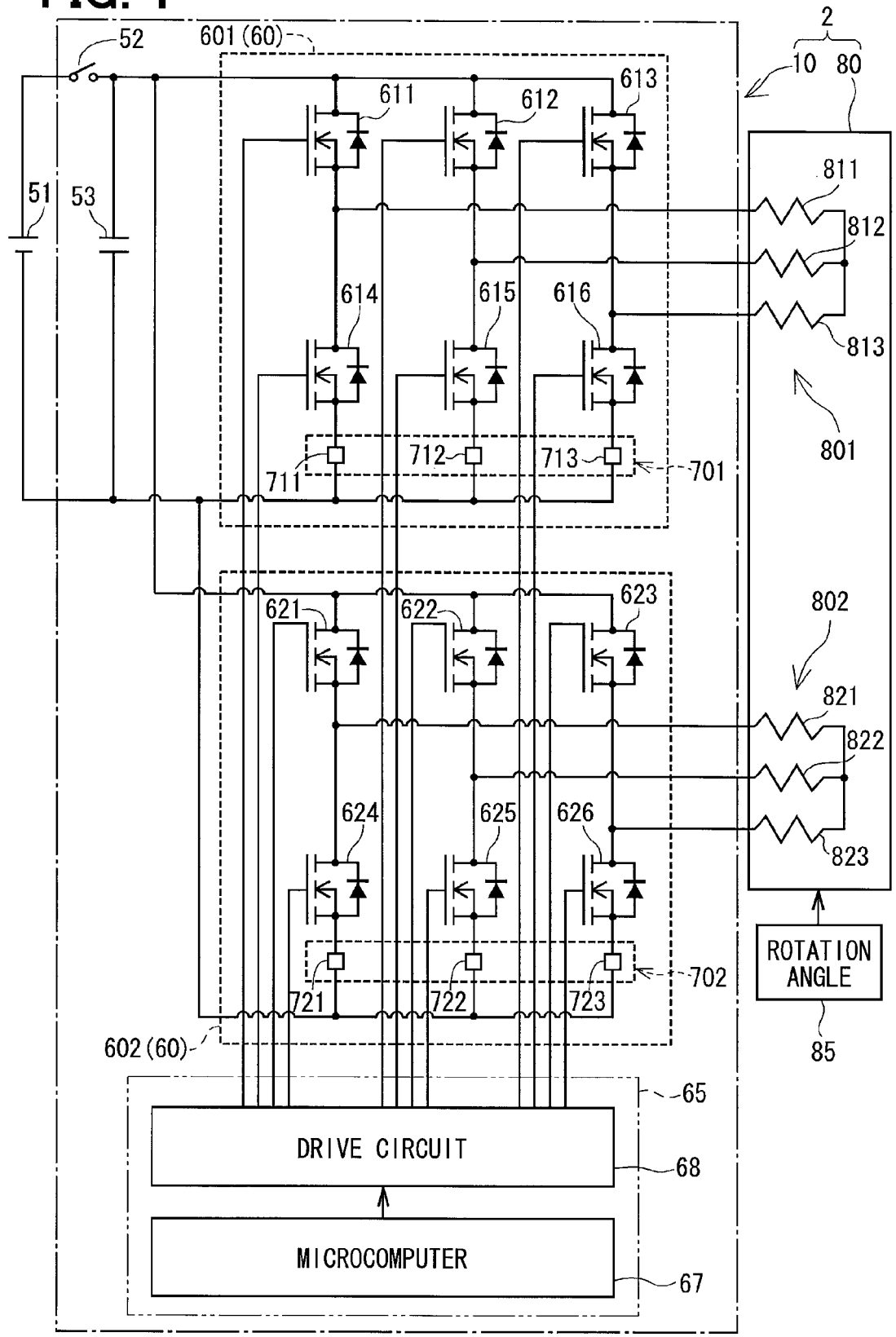
FIG. 1 is a circuit diagram of two sets of inverters controlled by a three-phase rotary machine control apparatus according to one embodiment.

As shown in FIG. 1, the motor 80 includes two coil sets (two sets of coils) 801 and 802. The first coil set 801 is formed of three phase coils 811, 812 and 813 corresponding to the U-phase, V-phase and W-phase, respectively. The second coil set 802 is formed of three phase coils 821, 822 and 823 corresponding to the U-phase, V-phase and W-phase, respectively. The inverter 60 includes a first inverter 601 and a second inverter 601, which are provided in correspondence to the first coil set 801 and the second coil set 802, respectively. A combination of one inverter and one coil set corresponding to the inverter is referred to as one power supply system. Two power supply systems are thus formed in parallel relation to each other.

The ECU 10 includes a power relay 52, a capacitor 53, the first inverter 601, the second inverter 602, a first current detector 701, a second current detector 702, the control circuit 65 and the like. The current detectors 701 and 702 are provided as current detection sections, which detect phase currents supplied to the coil sets 801 and 802 by the inverters 601 and 602, respectively.

A battery 51 is a DC power source of, for example, 12 V. The power relay 52 is provided to allow or interrupt power supply from the battery 51 to the inverters 601 and 602. The capacitor 53 is connected in parallel with the battery 51 to store charges thereby to assist power supply to the inverters 601 and 602 and suppress noises such as surge currents.

In the first inverter 601, six switching devices 611 to 616 are connected in a bridge circuit form to switch over power supply among the coils 811 to 813 of the first coil set 801. The switching devices 611 to 616 are MOSFETs (metal-oxide-semiconductor field-effect transistors). The switching devices 611 to 616 are referred to as FETs 611 to 616.

Drains of FETs 611 to 613 provided at a high potential side are connected to a positive terminal of the battery 51. Sources of the FETs 611 to 613 are connected to drains of the FETs 614 to 616 provided at a low potential side. The sources of FETs 614 to 616 are connected to a negative terminal side of the battery 51 through current detectors (current detection sections) 711 to 713 to the low potential side of the battery 51. Junctions between the high-side FETs 611 to 613 and the low-side FETs 614 to 616 are connected to one ends of the coils 811 to 813, respectively. Current detectors 711 to 713 detect phase currents, which flow to the coils 811 to 813 of the U-phase, V-phase and W-phase, respectively.

In the second inverter 602, the switching devices (FETs) 621 to 626 and current detectors 721 to 723 forming the current detector 702 are configured similarly to the first inverter 601, respectively. The control circuit 65 includes a microcomputer 67, a drive circuit (pre-driver) 68. The microcomputer 67 is programmed to execute various calculations, which are related to control, based on input signals such as a torque signal, rotation angle signals. The drive circuit 68 is connected to the gates of FETs 611 to 616 and to the gates of FETs 621 to 626, thereby to turn on and off the FETs 611 to 616 and 621 to 626 under control of the microcomputer 67.

The motor 80 is configured as shown in FIGS. 3A to 3D. As shown in FIG. 3A, the motor 80 has a rotor 83, which rotates about a rotation axis O relative to a stator 84. The motor 80 is a three-phase brushless motor. The number of coils of the stator 84 is 12×m and the number of poles of permanent magnets 87 of the rotor 83 is 2×m, assuming that "m" is a natural number. Although "m" is 2 in this embodiment, it may be natural number other than 2.

The permanent magnets 87 of the rotor 83 and the stator 84 are arranged as shown in FIG. 3B, when viewed in a thrust direction Z indicated in FIG. 3A. A total of four (2×2) permanent magnets 87 are provided such that two N-poles and two S-poles are alternately arranged circularly. A total of twenty-four (12×2) coils are provided as a stator coil. That is, the stator coil includes four coil groups (1) to (4), each of which is formed of six coils. In each coil group, U1 coil, U2 coil, V1 coil, V2 coil, W1 coil and W2 coil are arranged in this order in the clockwise direction. More specifically, the coils U1, U2, V1, V2, W1, W2 are arranged as shown in FIG. 3C when viewed in the thrust direction Z and extended straightly. Each coil, for example U1 and U2 are arranged as shown in FIG. 3D when viewed in a radial direction R. As understood from FIG. 3D, the U1 coil, for example, is formed by winding one coil wire four turns (U1a, U1b, U1c and U1d) about one stator core protrusion 86 at every six protrusions. As a result, in case of the U-phase, the U2 coil 821 forming the second coil set 802 is assumed to be advanced by an electric angle 30° in the circumferential direction relative to the U1 coil 811 forming the first coil set 801. It is thus possible to advance the phase of the three-phase AC current supplied to the second coil set 802 by an electric angle of 30° relative to that supplied to the first coil set 801.

Figure 4:
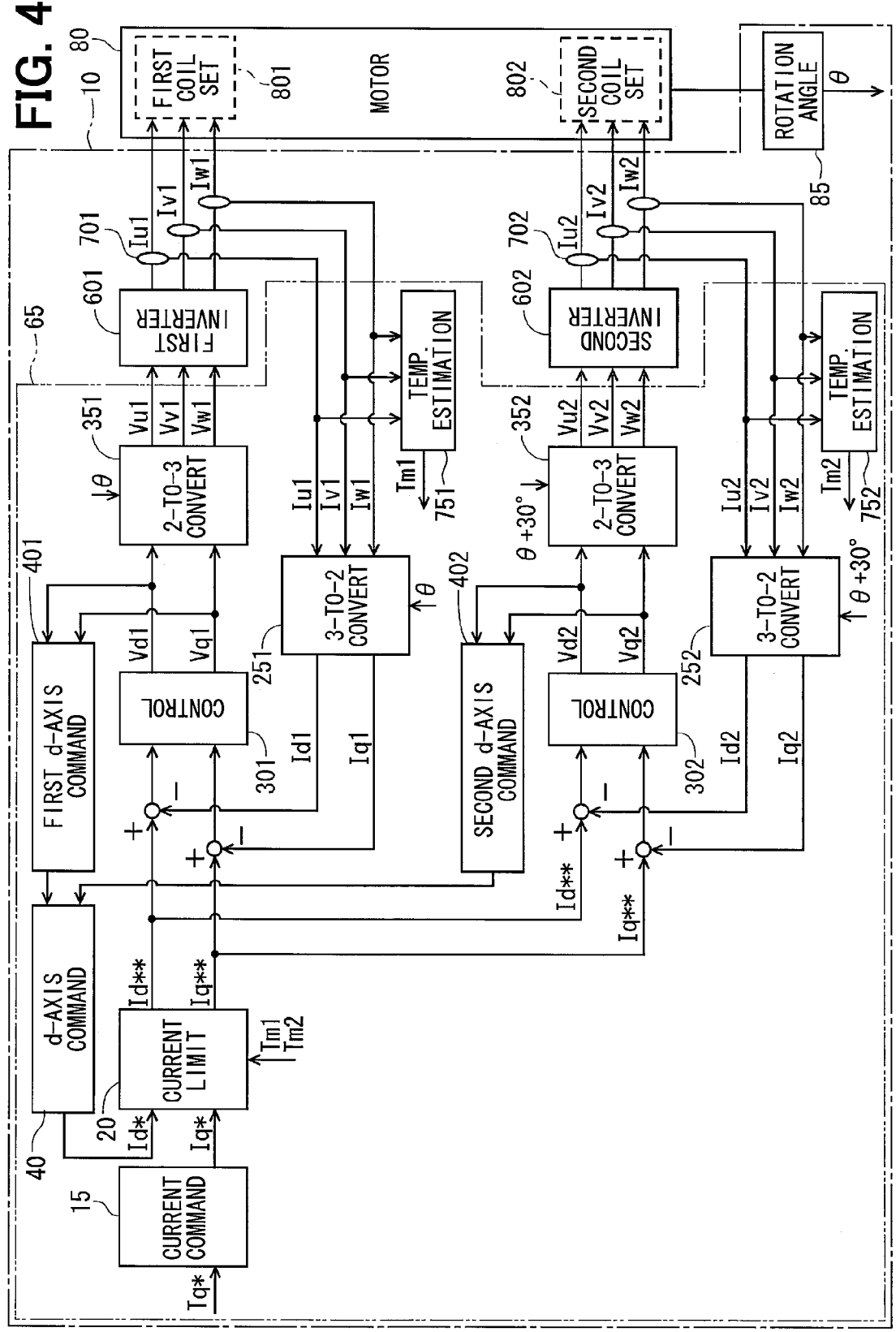
FIG. 4 is a block diagram of the three-phase rotary machine control apparatus shown in FIG. 1.

The ECU 10 is configured to have control functions as shown by functional blocks in FIG. 4. A main control part is indicated as the control circuit 65 and will be described in detail below. The control circuit 65 includes a current command value calculation section 15 and a current command value limitation section 20, which are both common to the first power supply system (first inverter 601 and first coil set 801) for and the second power supply system (second inverter 602 and second coil set 802). The control circuit 65 further includes, for the first and the second power supply systems, first and second three-to-two phase conversion sections 251 and 252, first and second control sections 301 and 302, first and second two-to-three phase conversion sections 351 and 352, and first and second temperature estimation section 751 and 752 as first and second temperature setting means, respectively.

The current command value calculation section 15 inputs a signal of steering torque Tq* of the torque sensor 94 and calculates a q-axis current command value Iq*, which is a torque current, based on a required torque. The current command value limitation section 20 inputs basically only the q-axis current command value Iq* from the current command value calculation section 15 in a range other than a high rotation speed range. In this case, the d-axis current Id, which is a field current, is set to zero (0) and the motor 80 is driven to generate the required torque by only a q-axis current Iq.

When the rotation speed of the motor 80 is high, that is, an angular rotation speed ω is large, an induced voltage generated by the motor 80 increases and as a result a q-axis voltage Vq increases. For this reason, the d-axis current Id is set to a negative value and its absolute value is increased in the high rotation speed range so that a counter-electromotive force is seemingly reduced and the q-axis voltage Vq is reduced. That is, weak magnetic field control is performed. This weak magnetic field control is advantageous in driving the motor 80 in the high rotation speed range. For this control, a d-axis current command value Id* is inputted from a d-axis current command value calculation section 40 to the current command value limitation section 20.

The current command value limitation section 20 sets a current limitation value for the current command value based on estimated temperatures Tm1 and Tm2 of the temperature estimation sections 751 and 752. Specifically, the current limitation value is set smaller as the higher one of the estimated temperatures Tm1 and Tm2 becomes higher. When the current command values Id* and Iq* exceed the current limitation value, such values are corrected to current command values Id and Iq, which are less than the current limitation value. The current command values after correction, that is, corrected current command values Id and Iq, that are supplied to the control sections 301 and 302 for the first power supply system 301 and the second power supply system 302, respectively. When the current command values Id* and Iq* do not exceed the current limitation value, such values are supplied to the control sections 301 and 302 for the first power supply system 301 and the second power supply system 302, respectively, without correction.

Current feedback control is executed independently for each power supply system as described below. In the first power supply system, the three-to-two phase conversion section 251 converts the three phase currents Iu1, Iv1 and Iw1 detected by the current detector 701 to a d-axis current detection value Id1 and a q-axis current detection value Iq1 based on the rotation angle θ fed back from the rotation angle sensor 85.

The control sections 301 is inputted with a difference of the d-axis current between the corrected command value Id and the detection value Id1 and a difference of the q-axis current between the corrected command value Iq and the detection value Iq1. The control section 301 calculates voltage command values Vd1 and Vq1 to converge these differences to zero. The control section 301 calculates the voltage command values Vd1 and Vq1 by, for example, performing PI (proportional and integral) control calculation using a proportional gain and an integration gain.

The two-to-three phase conversion section 351 converts the two phase voltage command values Vd1 and Vq1 to the three phase voltage command values Vu1, Vv1 and Vw1 detected based on the rotation angle θ fed back from the rotation angle sensor 85. The first inverter 601 supplies the phase currents Iu1, Iv1 and Iw1 to the first coil set 801 of the motor 80 in accordance with the three phase voltage command values Vu1, Vv1 and Vw1 so that the current detection values Id1 and Iq1 follow the current command values Id and Iq, respectively.

Figure 5A:
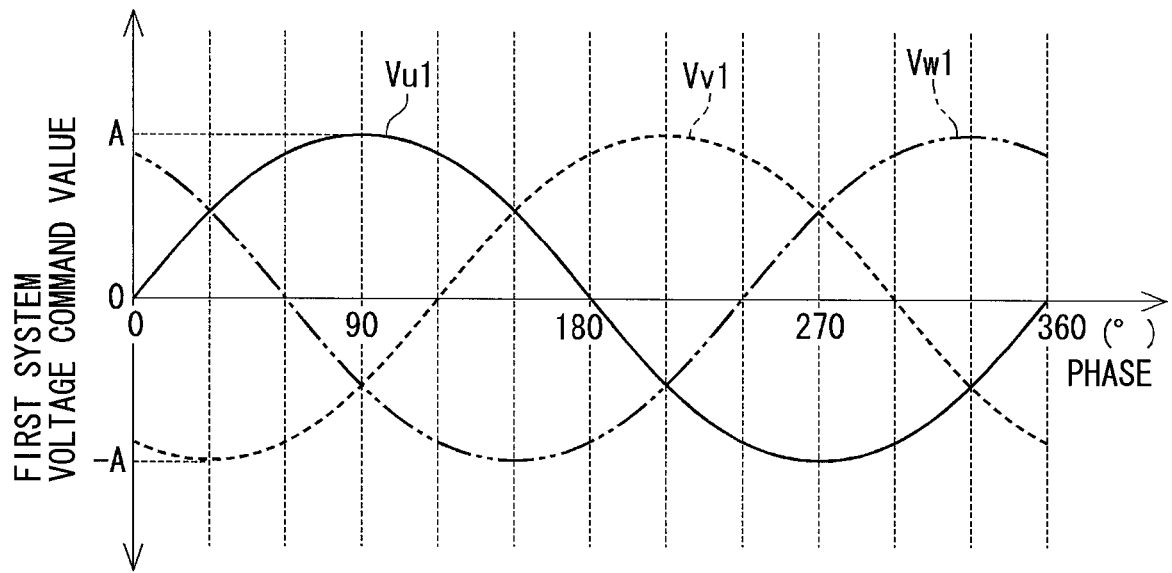
FIGS. 5A and 5B are signal waveforms of three phase voltage command values outputted to the two sets of inverters shown in FIG. 1.
Figure 5B:
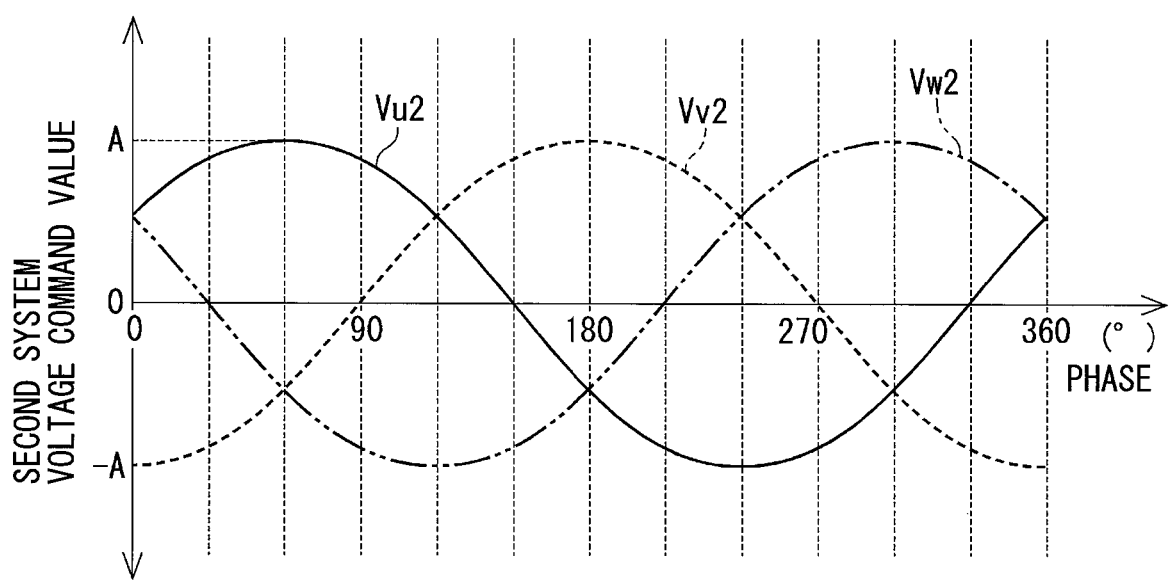

In the second power supply system, the three-to-two phase conversion section 252, the second control section 302 and the second two-to-three phase conversion section 352 are configured similarly to those of the first power supply system except for the following points. That is, the second power supply system is different from the first power supply system in that, as shown in FIGS. 5A and 5B, the waveforms of the three phase voltage command values Vu1, Vv1 and Vw1 of the first power supply system shown in FIG. 5A and the waveforms of the three phase voltage command values Vu2, Vv2 and Vw2 of the second power supply system shown in FIG. 5B have the same amplitude A but are shifted an electric angle of 30° from each other. This feature is provided by the above-described configuration of the motor 80. Thus, the electric angles, which are fed back to the three-to-two phase conversion section 252 and the two-to-three phase conversion section 352 of the second system is θ+30 °.

The voltage command values Vd1 and Vq1 for the first power supply system is fed back to the d-axis current command calculation section 40 through the d-axis current command value calculation section 401. The voltage command values Vd2 and Vq2 for the second power supply system is fed back to the d-axis current command calculation section 40 through the second power supply system d-axis current command value calculation section 402. As described above, in the high rotation speed range, the d-axis current command value calculation section 40 outputs the d-axis current command value Id* to the current command value limitation section 20 based on the voltage command values Vd and Vq, which are fed back. By thus feeding back the voltage command values Vd and Vq, the d-axis command current value Id* is regulated and "weak magnetic field control" is realized.

The temperature estimation sections 751 and 752 are described next. The temperature estimation section 751 of the first system calculates an estimated temperature Tm1 of the first inverter 601 or the coil set 801 based on integrated values of the phase current detection values Iu1, Iv1 and Iw1 detected by the current detector 701. The temperature estimation section 752 of the second power supply system calculates the second estimated temperature Tm2 of the second inverter 602 or the coil set 802 based on integrated values of the phase current detection values Iu2, Iv2 and Iw2 detected by the current detector 702.

The estimated temperature may be calculated as follows as one example. A heat generation amount Q is calculated as $Q[J]=RI^2[W]\times t[s]\times \eta$, in which R, I, t and η are a resistance, current, power supply period and thermal efficiency, respectively. The heat generation amount Q is thus calculated by integrating the phase current detection values Iu, Iv and Iw by time from the start of power supply. The heat generation amount Q is converted to a temperature increase based on the specific heat and heat transfer coefficient and the like of the inverters 601, 602 and coil sets 801, 802. The present temperature is estimated by adding this temperature increase to the temperature detected at the time of starting the power supply.

The estimated temperatures Tm1 and Tm2 are fed back to the current command value limitation section 20. The current command value limitation section 20 sets the current limit value to be smaller as the higher one of the estimated temperatures Tm1 and Tm2 becomes higher thereby prevent overheating of the inverters 601, 602 and the coil sets 801, 802.

According to the ECU 10 of the present embodiment described above, the first inverter 601 and the second inverter 602 supply the coils sets 801 and 802 three-phase voltages, which are the same in amplitude A but shifted from each by an electric angle of 30°, in response to the voltage command values of the control section 65. Thus torque ripple of the motor 80 is suppressed. As a result, the electric power steering system 1 can provide good steering operation feeling to a driver.

The ECU 10 of the present embodiment includes the temperature estimation sections 751 and 752, which individually calculate the estimated temperatures Tm1 and Tm2 based on the integration values of the phase currents Iu, Iv and Iw detected by the current detectors 701 and 702. The estimated temperatures Tm1 and Tm2 are fed back to the current command value limitation section 20. The current command value limitation section 20 sets the current limitation value as the limitation values of the current command values Id and Iq. When the current command values Id* and Iq* exceeds the current command values, such values are corrected to the corrected current command values Iq and Id, which are less than the current limitation value. Thus, the inverters 601, 602 and the coil sets 801, 802 are protected from overheating thus protecting the ECU 10 and the motor 80.

In this case, both the current command values Id and Iq are supplied to both the first power supply system and the second power supply system in common, even when only the estimated temperature Tm1 of the systems (first power supply system, for example) is higher than that of the other system (second power supply system). The power supplied to the coil sets 801, 802 from the inverters 601, 602 are limited similarly. Thus, without increasing torque ripple, which is caused between difference of power, the current command values Id and Iq are optimally set so that the inverters 601, 602 and the coils sets 801 and 802 are protected from overheating.

Other Embodiments (a) In FIGS. 3A to 3D, the motor 80 is exemplified so that the second coil set 802 is advanced relative to the first coil set 801 by +30° phase difference in electric angle. However, the second coil set 802 may be delayed relative to the first coil set 801 by −30° phase difference in electric angle. The phase of the U-phase of the second coil set 802 may be different in phase by ±90° or ±150° in electric angle, that is, ±30° relative to the V-phase or the W-phase (±120° relative to the U-phase) of the first coil set 801. This means that the phase current supplied to the first coil set 801 and the second coil set 802 may be set to have a phase difference of $(30\pm 60\times n)°$ from each other with "n" being an integer.

(b) In the embodiment described above, the temperature estimation sections 751 and 752 are provided to calculate the estimated temperatures Tm1 and Tm2 of the inverters 601 and 602 or the coil sets 801 and 802 based on the integrated value of the phase current values detected by the current detectors 701 and 702. The current command value limitation section 20 sets the current limitation value based on the estimated temperature Tm1 and Tm2 thereby to prevent overheating. As other embodiments, the current command value limitation section 20 may set the current limitation values based on other physical quantities such as electric energy, heat generation amount, which is other than the estimated temperature calculated from the phase current detection values, without providing the temperature estimation sections 751 and 752. Since the phase current detection value itself has a correlation with the temperature of the inverter and the coil set, the current limitation value may be set based on the physical quantity calculated from the phase current detection value so that overheating is prevented.

(c) The ECU 10 may be configured differently. For example, the switching device may be a field-effect transistor other than a MOSFET, and IGBT or the like.

(d) The control apparatus for the three-phase rotary machine is not limited to the motor control apparatus for the electric power steering system but may be used as a control apparatus for other three-phase motors or generators.

Further modifications and alterations will be possible to the control apparatus described above, and the control apparatus is not limited to such embodiments but may be implemented in various embodiments.

What is claimed is:

1. A control apparatus for a three-phase rotary machine having two coil sets, each of which is formed of three phase coils, the control apparatus comprising:
   two power converters provided for the two coil sets, to supply AC power voltages to the two coils sets, respectively, the AC power voltages having same amplitudes and different phases of $(30\pm 60\times n)°$ phase difference from each other with "n" being an integer;
   current detectors for detecting phase currents supplied from the two power converters to the two coil sets, respectively; and
   a control circuit including a current command value calculation section for outputting a current command value to both of the two power converters and a current command value limitation section for setting an upper limitation value of the current command value, the control circuit controlling the two power converters by feeding back the phase current detection values of the two current detectors to the current command value respectively, wherein:
   the current command value limitation section sets the current limitation value based on a predetermined physical amount calculated as a function of the phase current detection values detected by the current detectors;
   the control circuit further includes temperature estimation sections for estimating temperatures of the power converters or the coil sets based on an integration value of the phase current detection values detected by the current detectors; and
   the current command value limitation section sets the current limitation value based on the estimated temperatures of the temperature estimation sections.

2. A control apparatus for a three-phase rotary machine having two coil sets, each of which is formed of three phase coils, the control apparatus comprising:
   two power converters provided for the two coil sets, to supply AC power voltages to the two coils sets, respectively, the AC power voltages having same amplitudes and different phases of $(30\pm 60\times n)°$ phase difference from each other with "n" being an integer;
   current detectors for detecting phase currents supplied from the two power converters to the two coil sets, respectively; and
   a control circuit including a current command value calculation section for outputting a current command value to both of the two power converters and a current command value limitation section for setting an upper limitation value of the current command value, the control circuit controlling the two power converters by feeding back the phase current detection values of the two current detectors to the current command value respectively, wherein:
   the current command value limitation section sets the current limitation value based on a predetermined physical amount calculated as a function of the phase current detection values detected by the current detectors; and
   the current command value limitation section sets the current limitation value based on a function of a larger one of the phase current detection values detected by the current detectors.

* * * * *